United States Patent [19]

Inaga et al.

[11] Patent Number: 4,623,931
[45] Date of Patent: Nov. 18, 1986

[54] PORTABLE VIDEO CAMERA WITH IMAGE PICK-UP DEVICE

[75] Inventors: Katsu Inaga, Tokyo; Nobuo Uda, Konae; Tatsuo Inoue, Fuchu, all of Japan

[73] Assignee: Sony Corporation, Tokyo, Japan

[21] Appl. No.: 561,357

[22] Filed: Dec. 14, 1983

[30] Foreign Application Priority Data

Dec. 17, 1982 [JP] Japan .............................. 57-190902[U]

[51] Int. Cl.⁴ ............................................... H04N 9/28
[52] U.S. Cl. ................................... 358/227; 354/106; 354/407; 358/229
[58] Field of Search ............... 354/293, 163, 400, 402, 354/403, 406, 407, 408, 421; 358/209, 225, 229, 227, 228, 224, 41, 211, 335, 906; 357/242 R; 250/578; 352/140

[56] References Cited

U.S. PATENT DOCUMENTS

| | | | |
|---|---|---|---|
| 3,786,184 | 1/1974 | Pieters | 358/227 |
| 3,845,238 | 10/1974 | Schneider et al. | 358/209 |
| 4,032,934 | 6/1977 | Hendrickson et al. | 354/140 |
| 4,230,401 | 10/1980 | Tokutomi et al. | 354/406 |
| 4,381,823 | 4/1983 | Eguchi et al. | 358/227 |
| 4,389,675 | 6/1983 | Suzuki et al. | 358/229 |
| 4,414,575 | 11/1983 | Yamamoto et al. | 358/227 |
| 4,423,436 | 12/1983 | Fimura | 358/98 |

*Primary Examiner*—Robert G. Lev
*Attorney, Agent, or Firm*—Lewis H. Eslinger; Alvin Sinderbrand

[57] ABSTRACT

A video camera comprising a body with a handgrip attached to one side thereof is disclosed. The handgrip accommodates a automatic focus adjusting mechanism, which effects automatic focus adjustment of an image focusing optical system for focusing an image of an object on an image pick-up plane by emitting measuring light from a light emitting section and measuring the distance of the object from a lens by detecting the measuring light reflected by the object in a light receiving section. Either the center of the measuring light emitted from the light emitting section or the center of the measuring light incident on the light receiving section coincides with the optical axis of an image pick-up optical system.

3 Claims, 5 Drawing Figures

PORTABLE VIDEO CAMERA WITH IMAGE PICK-UP DEVICE

BACKGROUND OF THE INVENTION

1. Field of the Invention

This invention relates to a video camera with an automatic focus adjusting mechanism, which effects automatic focus adjustment of an image focusing optical system for focusing an image of an object on an image pick-up plane by emitting measuring light from a light emitting section and measuring the distance of the object from a lens by detecting the measuring light reflected by the object in a light receiving section, and more particularly to a portable video camera with a handgrip for carrying it.

2. Description of the Prior Art

There have heretofore been video cameras with an automatic focus adjusting mechanism for automatically adjusting the focus of an image pick-up lens by measuring the distance between the video camera body and an object to be picked up. The automatic focus adjusting mechanism drives an image pick-up lens focusing mechanism according to distance information obtained in a distance measuring section which is usually based on a light objection system using principles of the triangular surveying or a two-fold image coincidence system.

With the distance measuring section using triangular surveying principles, it is necessary to provide a long base line for triangular surveying in order to obtain sufficient precision for measuring distances. In addition, to avoid problems with parallax, the optical axis of the distance measuring system and the optical axis of the image pick-up system must coincide with each other.

Portable video cameras include those of the popular handheld type and shouldering type, which comprises a small size and light weight video camera body with a handgrip attached thereto for easy operation.

FIG. 1 is a perspective view of a well-known video camera of the shouldering type with an automatic focus adjusting mechanism.

The prior art video camera shown in FIG. 1 comprises a camera body 1, which is secured to a shouldering frame 2. The user may take pictures using this camera in a stable posture by shouldering a shouldering section 3 of the frame 2 and gripping a handgrip 4 projecting from the front of the frame 2.

The camera body 1 has a cylindrical lens holder 7 projecting from the front and supporting an image pick-up lens 6. The cylindrical lens holder 7 also supports a focus adjusting ring 8, which permits focus adjustment by the operation of an automatic focus adjusting mechanism not shown, which is accommodated in a housing 9 provided under the lens holder 7, or by manual operation. The housing 9 has two distance measurement windows or apertures 11 and 12 formed on the front. As shown in FIG. 2, light from an object, which enters the windows 11,12 respectively, is focused on a charge coupled device CCD line sensor 18 through reflecting mirrors 13 and 14, image focusing lenses 15 and 16 and a reflecting prism 17. The light from an object which enters through the window 11 is focused on and forms a reference image focused on the CCD line sensor 18 at a predetermined position thereof, while the light from the object which enters through the other window 12 forms a movable image on the CCD line sensor 18, which movable image is movable along the CCD line sensor 18 according to the distance of the object. The reference and movable images focused on the CCD line sensor 18 are used to calculate the distance of the object in order to control a focusing motor for automatic focus adjustment.

In the usual video camera with an automatic focus adjusting mechanism, erroneous operation thereof is liable to result in cases where the object is beyond the distance range (i.e., image angle range) measurable by the automatic focus adjusting mechanism or where a low contrast object is to be picked-up or where background and foreground scenes coexist. Due to these automatic focus problems, it is possible to adjust the focus manually as well. In the prior art video camera of the structure shown in FIG. 1, the housing 9 of the automatic focus adjusting mechanism provided under the lens holder 7 of the image pick-up lens 6 obstructs the manual operation of the focus adjusting ring 8, so that the operability is very inferior. Besides, there occurs parallax problems since the optical axes of the distance measuring system and image pick-up system do not coincide. Furthermore, because the prior art camera does not provide a long reference line for triangular light measurement, the precision of distance measurement is low.

SUMMARY OF THE INVENTION

An object of the present invention is to provide a portable video camera, with which automatic focus adjustment can be obtained through highly precise detection of the position of an object without giving rise to any parallax introduced in the distance measurement.

Another object of the present invention is to provide a portable video camera, with which automatic focus adjustment can be obtained through highly precise measurement of the distance of the object using principles of the triangular surveying.

A further object of the present invention is to provide for size reduction of the portable video camera, which is capable of both automatic focus adjustment and manual focus adjustment, and also improvement of the operability of the camera when effecting manual focus adjustment.

The above and further objects and features of the invention will become more apparent from the following detailed description when the same is read with reference to the accompanying drawings illustrating a preferred embodiment of the invention.

DESCRIPTION OF THE PREFERRED EMBODIMENT

Now, an embodiment of the video camera according to the present invention will be described with reference to the drawings.

Figure 1:
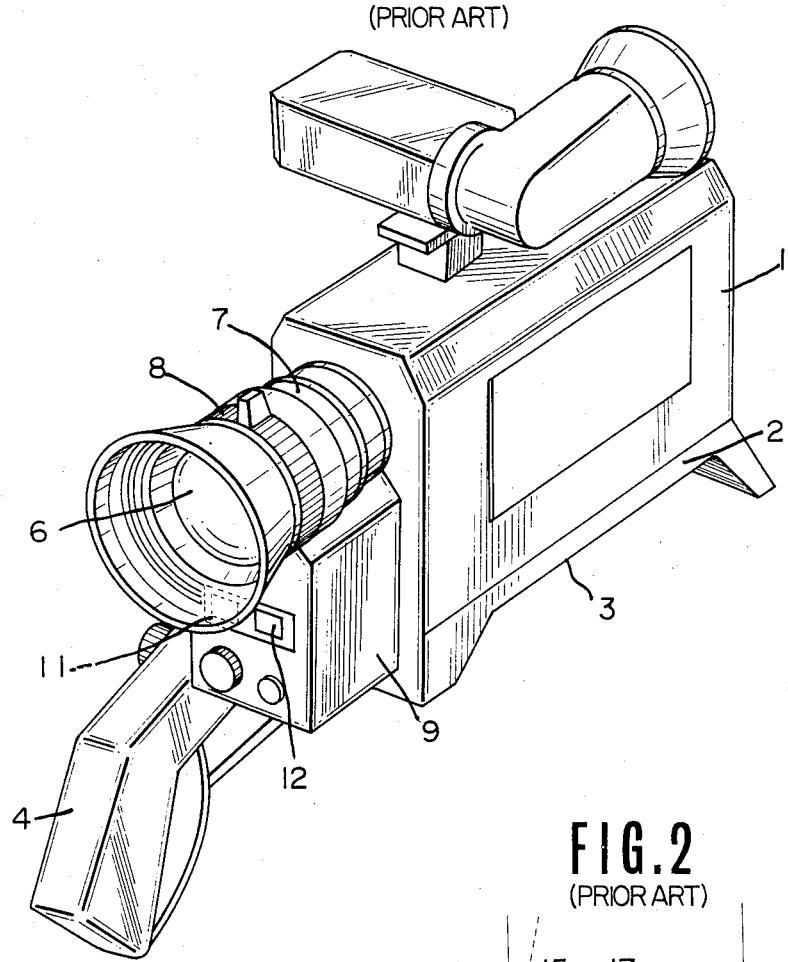
FIG. 1 is a perspective view showing a prior art video camera.
Figure 2:
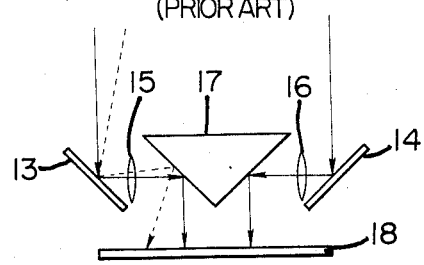
FIG. 2 is a schematic view for explaining the principles of the distance measurement in the prior art video camera.
Figure 3:
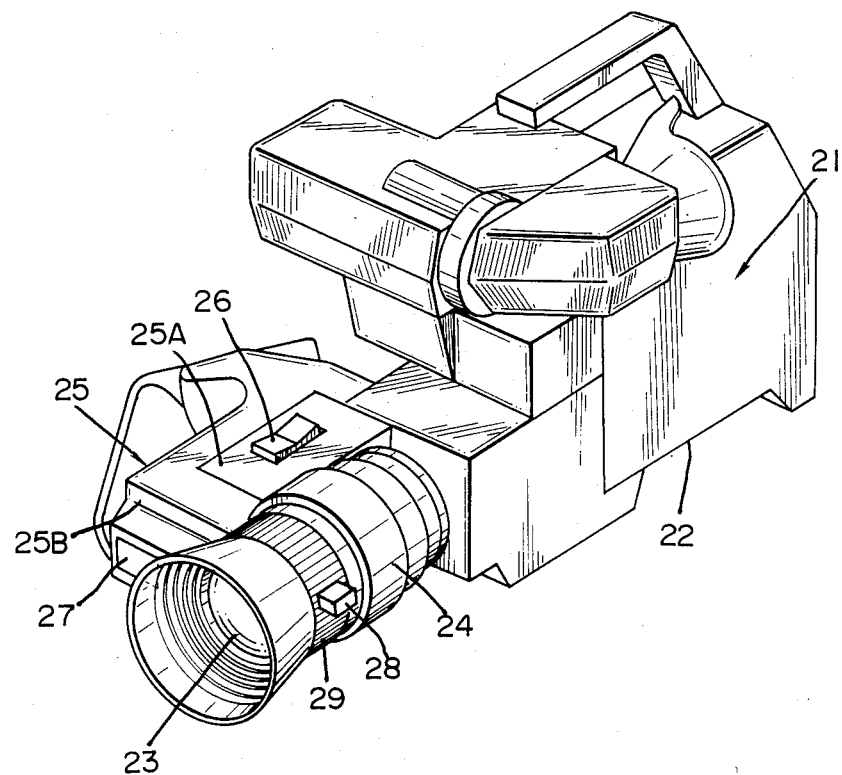
FIG. 3 is a perspective view showing an embodiment of the video camera according to the present invention.

Referring to FIG. 3, there is shown a perspective view of an embodiment of the present invention applied to a video camera of a shouldering type. The video camera comprises a camera body 21 with a shouldering section 22 provided at the bottom. A cylindrical lens holder 24 supporting an image pick-up lens 23 is accommodated in it and projects from the camera body 21. The camera has a handgrip 25 provided on one side (i.e., right side in this embodiment) of the outer periphery. The user may take pictures using this video camera in a stable posture by shouldering the shouldering section 22 of the camera body 21 on the right shoulder and gripping the grip 25 with the right hand.

In this embodiment of video camera, an automatic focus adjusting mechanism is accommodated in the handgrip 25. The handgrip 25 has a button 26 provided at its top 25A, for operating a drive switch for the automatic focus adjusting mechanism. It also has a light receiving window 27 for distance measurement provided at the front 25B of the handgrip 25.

Numeral 28 in FIG. 3 designates a knob for manually operating a focus adjusting ring 29 for the image pick-up lens 23. With this embodiment of video camera, with the automatic focus adjusting mechanism held inoperative, the focus can be manually adjusted by operating the knob 28.

Figure 4:
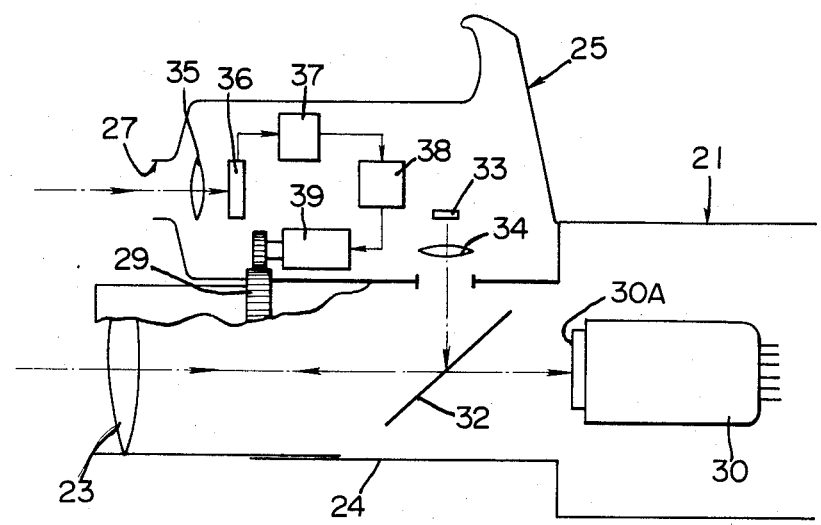
FIG. 4 is a block diagram top view showing the structure of an automatic focus adjusting mechanism in the embodiment of the present invention.

As shown in FIG. 4, in this embodiment the cylindrical lens holder 24 supporting the image pick-up lens 23 also accommodates a beam splitter 32, which is located on the optical axis of the image pick-up lens 23, i.e., the optical axis of the image pick-up system for focusing the image of the object of an image pick-up surface 30A of an image pick-up device 30 provided in the camera body 21. The handgrip 25 accommodates a light emitting section 33, for instance an infrared radiation emitting diode. The light emitting section 33 can emit measuring light, which is directed to the beam splitter 32 in the lens holder 24 through a collimate lens 34 and thence directed to an object 40, shown in FIG. 5 to be picked up along the optical axis of the image pick-up optical system through the beam splitter 32. The measuring light reflected by the object 40 enters the interior of the handgrip 25 through the light receiving window 27 provided thereon for distance measurement, and is incident on a light receiving section 36, for instance a silicon photodiode or the like, through a condenser lens 35.

Figure 5:
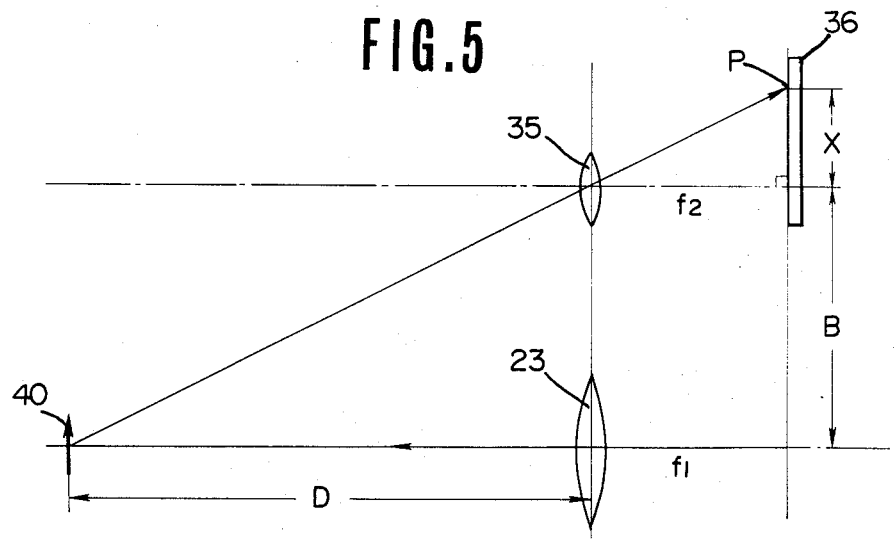
FIG. 5 is a schematic view for explaining the principles of the distance measuremenet in the embodiment of the present invention.

Referring to the schematic view of FIG. 5, the focal length of the image pick-up lens 23 is indicated at $f_1$, the focal length of the condenser lens 35 is indicated at $f_2$, and the distance between the axes of the image pick-up lens 23 and the condenser lens 35 is indicated at B. The position P, at which the measuring light is incident on the light receiving section 36, varies corresponding to the distance D of the object 40. The moving distance x of the position P has the relationship $$D:B = f_2:x.$$

That is,
$$D = (B \cdot f_2)/x \tag{1}$$

The equation (1) represents the distance D from the object 40.

A distance measuring circuit 37 calculates the distance D from the object 40 using the equation (1) with the position P of incidence of measuring light on the light receiving section 36, yielding distance information. It is to be understood that in this embodiment the distance D is measured under the principles of triangular surveying. According to the measurement data obtained from the distance measuring circuit 37 a motor drive circuit 38 drives a focusing motor 39 to cause rotation of the focus adjusting ring 29 so as to control the focal length $f_1$ of the image pick-up optical system for automatic focus adjustment.

In this embodiment, the measuring light emitted is directed to proceed along the optical axis of the image pick-up optical system through the beam splitter 32 provided in the lens holder 24. Thus, the object 40 can be picked up accurately and without any distance measurement parallax. Further, since the measuring light enters the interior of the handgrip 25 through the light receiving window 27 and thence incident on the light receiving section 36 through the condenser lens 35, the distance B between the axes of the image pick-up lens 23 and the condenser lens 35, i.e., the length of reference line segment in the triangular surveying, can be made sufficiently large to obtain highly precise measurement of the distance D from the object 40 under the principles of triangular surveying. Further, since the automatic focus adjusting mechanism is accommodated in the handgrip 25, the size of the video camera can be reduced, and also the operability when manually operating the focus adjusting ring 29 for the image pick-up lens 23 can be improved. The light emitting and receiving sections 33 and 36 may be interchanged in their disposition in the above embodiment.

What is claimed is:

1. A portable video camera with an image pick-up device comprising:
   a camera body having a handgrip attached thereto;
   adjustable focusing lens means having an optical axis and being attached to the front of said body and capable of focus adjustment for focusing on said image pick-up device an object to be picked up;
   adjusting means operative by an adjusting signal for adjusting the focus of said lens means;
   light emitting means for emitting measuring light to said object;
   light receiving means for receiving the measuring light reflected from said object and for generating a signal corresponding to the distance between said lens means and said object; and
   means for supplying said signal as said adjusting signal to said adjusting means;
   said light emitting means, light receiving means and supplying means being arranged in said handgrip so that one of the measuring light emitted from said light emitting means and the measuring light reflected from said object to said light receiving means coincides with said optical axis of said lens means.

2. A portable video camera with an image pick-up device according to claim 1; further comprising beam splitting means separating from the light to said image pick-up device one of the measuring light from said light emitting means and the measuring light reflected from said object.

3. A portable video camera with an image pick-up device according to claim 1; wherein said adjusting means includes a motor operable by said adjusting signal and a focus adjusting ring driven by said motor.

* * * * *